US008726841B2

(12) United States Patent
Schluter, II

(10) Patent No.: US 8,726,841 B2
(45) Date of Patent: May 20, 2014

(54) AQUARIUM ACCESSORY

(71) Applicant: Richard C. Schluter, II, Madison, VA (US)

(72) Inventor: Richard C. Schluter, II, Madison, VA (US)

(*) Notice: Subject to any disclaimer, the term of this patent is extended or adjusted under 35 U.S.C. 154(b) by 0 days.

(21) Appl. No.: 13/651,971

(22) Filed: Oct. 15, 2012

(65) Prior Publication Data

US 2013/0098304 A1 Apr. 25, 2013

Related U.S. Application Data

(62) Division of application No. 12/784,858, filed on May 21, 2010, now Pat. No. 8,291,864.

(51) Int. Cl.
*A01K 63/00* (2006.01)

(52) U.S. Cl.
USPC ............................................. 119/249

(58) Field of Classification Search
USPC .................. 119/248–250, 265, 245
See application file for complete search history.

(56) References Cited

U.S. PATENT DOCUMENTS

| | | | |
|---|---|---|---|
| 192,595 A * | 7/1877 | Palen .............................. | 141/59 |
| 1,943,417 A * | 1/1934 | Bringman ..................... | 119/249 |
| 2,059,927 A * | 11/1936 | Beck ............................... | 405/83 |
| 3,991,715 A * | 11/1976 | Gibson, Jr. ..................... | 119/249 |
| D248,782 S | 8/1978 | Randall, Jr. | |
| 5,067,439 A * | 11/1991 | Hand .............................. | 119/249 |
| 5,183,004 A * | 2/1993 | Trent et al. ..................... | 119/246 |
| 5,317,991 A * | 6/1994 | Lee et al. ........................ | 119/249 |
| 5,488,931 A * | 2/1996 | Grosman ........................ | 119/265 |
| 5,634,433 A * | 6/1997 | Schmitt ......................... | 119/250 |
| 6,848,395 B2 * | 2/2005 | Deming, Jr. .................. | 119/250 |
| 2009/0139457 A1 | 6/2009 | Luong et al. | |

* cited by examiner

*Primary Examiner* — Kristen C Hayes
(74) *Attorney, Agent, or Firm* — Welsh Flaxman & Gitler LLC

(57) ABSTRACT

An aquarium accessory shaped and dimensioned for sitting upon the upper edge of an aquarium frame to elevate the water level in an aquarium for viewing fish contained within the aquarium outside of the aquarium. The aquarium accessory includes a transparent container shaped and dimensioned to sit upon a support shelf in an inverted configuration for the creation of a mechanism for holding water above a water surface of the aquarium. The support shelf is shaped and dimensioned for mounting along a frame of an aquarium and includes a base member having a central aperture. The support shelf includes arms supporting the base below the waterline of an aquarium. The lower ends of the arms are connected to the base and the upper ends of the arms are secured to a lateral flange member extending therefrom, the lateral flange member includes first and second downwardly extending flange members shaped and dimensioned to wrap about the adjacent walls of an aquarium. The accessory further includes a hood which cooperates with the support shelf.

9 Claims, 12 Drawing Sheets

AQUARIUM ACCESSORY

CROSS REFERENCE TO RELATED APPLICATION

This application is a division of U.S. Pat. application Ser. No. 12/784,858, filed May 12, 2010, entitled "AQUARIUM ACCESSORY", now U.S. Patent No. 8,291,864.

BACKGROUND OF THE INVENTION

1. Field of the Invention

The present invention relates to aquarium accessories. More particularly, the present invention relates to an aquarium accessory elevating the water level thereof to form a water column above an aquarium for viewing of fish contained within the aquarium while providing additional swimming area for the fish and viewing area for the owner of the fish.

2. Description of the Related Art

Fish bridges and other attachments for aquarium tanks are known and provide a mechanism for holding water above the surface of the water in an aquarium and thereby providing an additional swimming area for the fish in the aquarium. However, and as discussed in U.S. Pat. No. 3,991,715 to Gibson, Jr., they are often difficult to fill and/or require complex structures for erecting the devices above the water surface of the aquarium. In addition, these devices cannot be used with a conventional hood in place.

The present aquarium accessory overcomes these deficiencies by providing an easily accessible shelf below the water line of the aquarium and a transparent container which can easily be placed into and under the waterline in an aquarium to fill the container with water and then position the container on the support shelf while inverted such that the water in the container rises above the aquarium upper edge.

SUMMARY OF THE INVENTION

It is, therefore, an object of the present invention to provide an aquarium accessory for elevating the water level of an aquarium above the upper edge of the aquarium for viewing fish contained within an aquarium outside of the aquarium. The aquarium accessory includes a support shelf to be positioned below the waterline of the aquarium. The support shelf includes an upper surface and a lower surface with an aperture extending through the upper and lower surfaces to form an opening for fish to swim through. The aquarium accessory further includes a support frame shaped and dimensioned for mounting along an upper edge of the aquarium. The support frame includes a lateral flange member to which is connected at least one elongated support arm wherein the at least one elongated support arm is connected to the lateral flange member so that the lateral flange member and support shelf are parallel and spaced from one another. A step is positioned between the lateral flange member and the at least two elongated support arms in order to mate with a profile of the upper edge of the aquarium. The aquarium accessory also includes a transparent container shaped and dimensioned to sit upon the upper surface of the support shelf in an inverted configuration for the creation of a mechanism for holding water above the aquarium and thereby providing additional swimming area for fish in the aquarium.

It is also an object of the present invention to provide an aquarium accessory wherein the at least one elongated support arm includes a first elongated support arm and a second elongated support arm perpendicular thereto. The support frame further includes a first tab downwardly extending from the lateral flange member, the first tab being spaced and parallel to the first elongated support arm, and a second tab downwardly extending from the lateral flange member, the second tab being spaced and parallel to the second elongated support arm. The first and second elongated support arms, the lateral flange member and the first and second tabs are shaped and dimensioned to wrap about adjacent walls of the aquarium when attached thereto.

It is another object of the present invention to provide an aquarium accessory wherein the first tab includes a threaded aperture and a fastener threaded into the threaded aperture in the direction of the first elongated support arm and the second tab includes a threaded aperture and a fastener threaded into the threaded aperture in the direction of the second elongated support arm.

It is a further object of the present invention to provide an aquarium accessory wherein the step is a ridge member secured to an underside of the lateral flange member.

It is also an object of the present invention to provide an aquarium accessory wherein the step is an L-shaped support surface formed between the at least one elongated support arm and the lateral flange member.

It is another object of the present invention to provide an aquarium accessory including an aquarium hood secured within the L-shaped support surface.

It is a further object of the present invention to provide an aquarium accessory wherein the support frame includes plural covers pivotally attached thereto.

It is also an object of the present invention to provide an aquarium accessory wherein the support frame includes a hood base member shaped and dimensioned to substantially conform to a profile defined by the upper edge of the aquarium.

It is another object of the present invention to provide an aquarium accessory wherein the hood base member includes a front edge, a back edge, a first lateral edge and a second lateral edge. The hood base member further includes a transverse dividing member extending between the first lateral edge and the second lateral edge to divide the hood base member into a front portion having a front opening and a rear portion having a rear opening.

It is a further object of the present invention to provide an aquarium accessory wherein the front portion of the hood base member includes upwardly extending walls defining a periphery thereof, and a cover is pivotally secured thereto for selective access to the front opening.

It is also an object of the present invention to provide an aquarium accessory including an aquarium hood shaped and dimensioned for sitting upon an upper edge of an aquarium frame. The aquarium hood includes a support frame and a support shelf positioned within a central opening defined by the support frame. The support shelf is supported relative to the support frame by a plurality of elongated support arms connecting the support shelf to the support frame. The support shelf includes an opening formed therein. The aquarium accessory further includes a transparent container shaped and dimensioned to sit upon the support shelf in an inverted configuration for the creation of a mechanism for holding water above a water surface of an aquarium.

It is another object of the present invention to provide an aquarium accessory wherein the support frame includes a hood base member shaped and dimensioned to substantially conform to a profile defined by the upper edge of the aquarium frame.

It is a further object of the present invention to provide an aquarium accessory wherein the hood base member includes a front edge, a back edge, a first lateral edge and a second lateral edge. The hood base member further includes a transverse dividing member extending between the first lateral edge and the second lateral edge to divide the hood base member into a front portion having a front opening and a rear portion having a rear opening.

It is also an object of the present invention to provide an aquarium accessory wherein the front portion of the hood base member includes upwardly extending walls defining a periphery thereof, and a cover is pivotally secured thereto for selective access to the front opening.

It is another object of the present invention to provide an aquarium accessory wherein the cover includes a first cover member and a second cover member.

It is a further object of the present invention to provide an aquarium accessory wherein the support shelf is secured to the support frame within the front opening defined at the front portion of the support frame.

It is also an object of the present invention to provide an aquarium accessory wherein the support shelf is secured to the support frame within the front opening defined at the front portion of the support frame.

It is another object of the present invention to provide an aquarium accessory wherein the support shelf has four sides and three elongated support arms extending from the support shelf to the support frame and the three support arms only extend from three of the four sides of the support shelf, leaving one side of the support shelf unobstructed.

It is a further object of the present invention to provide an aquarium accessory wherein the transparent container is shaped and dimensioned to hold water above the aquarium hood.

It is also an object of the present invention to provide an aquarium accessory wherein the support shelf has four sides and the plurality of elongated support arms consist only of a first elongated support arm on a first side of the support shelf, a second elongated support arm on a second side of the support shelf and a third elongated support arm on a third side of the support shelf, thus leaving a fourth side of the support shelf unobstructed.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

Figure 1:
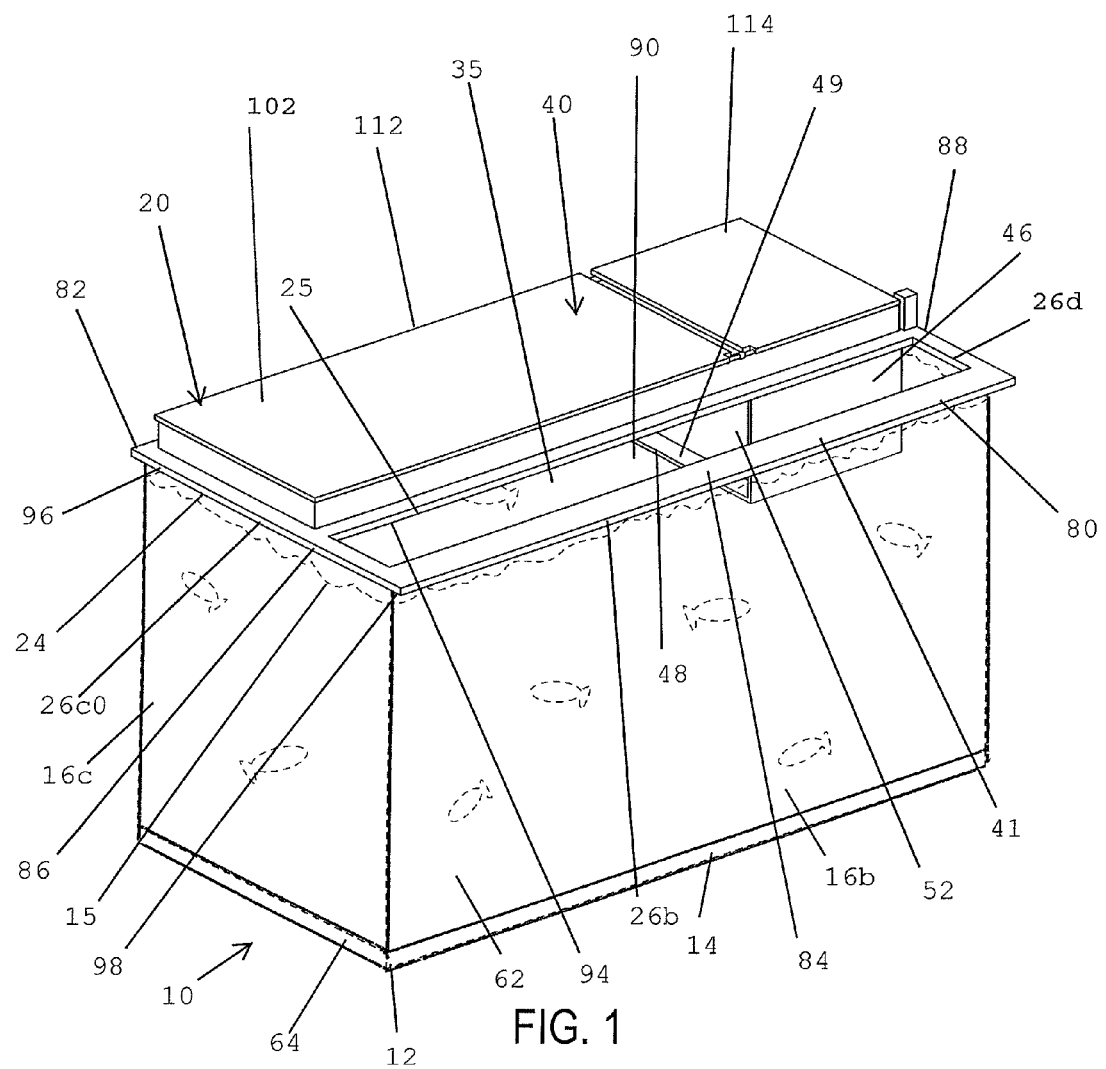
FIGS. 1 to 3 show various views of an aquarium with the present accessory secured thereto.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

In accordance with the present invention, and with reference to FIGS. 1 to 5, an aquarium accessory in the form of a support shelf 48 and a transparent container 50 rising above the water level of an aquarium 10 is disclosed. The aquarium 10, shown in phantom lines, is conventional and includes an aquarium frame 12 having a base 14, transparent sidewalls 16a, b, c & d, and an upper edge 24 defining an opening 25. The upper edge 24 is comprised of upper edges 26a, b, c & d of their respective sidewalls. The aquarium 10 is shaped and dimensioned for holding a predetermined amount of water and having an upper waterline 15. An aquarium hood 40, shaped and dimensioned for sitting upon the upper edge 24 of the aquarium frame 12 is positioned thereon.

The aquarium hood 40 includes a hood support frame 41 substantially the same as the profile defined by the upper edge 24 of the aquarium 10. In accordance with the embodiment shown with reference to FIGS. 1 to 5, a support shelf 48 is secured to and suspended from the hood support frame 41 and is positioned within the aquarium 10 such that the support shelf 48 is below the waterline 15.

In accordance with a preferred embodiment, a rectangular aquarium 10 is disclosed. The aquarium frame 12 disclosed with reference to FIGS. 1 to 3 includes a base 14 shaped and dimensioned to sit upon a horizontal support surface. The base 14 includes a plurality of edges 64 to which the transparent sidewalls 16a, b, c &d are secured in a manner defining the outer wall 62 of the aquarium 10. In accordance with this embodiment, the aquarium 10 includes a front sidewall 16a, a rear sidewall 16b, a first lateral sidewall 16c and a second lateral sidewall 16d. The lower edges of the respective sidewalls are secured to the base 14. The lateral edges of the sidewalls are secured to adjacent lateral edges of adjacent sidewalls. The various edges are coupled with watertight seals such that the base 14, front sidewall 16a, rear sidewall 16b, first lateral sidewall 16c and second lateral sidewall 16d define an enclosure tank in which water is held.

Figure 2:
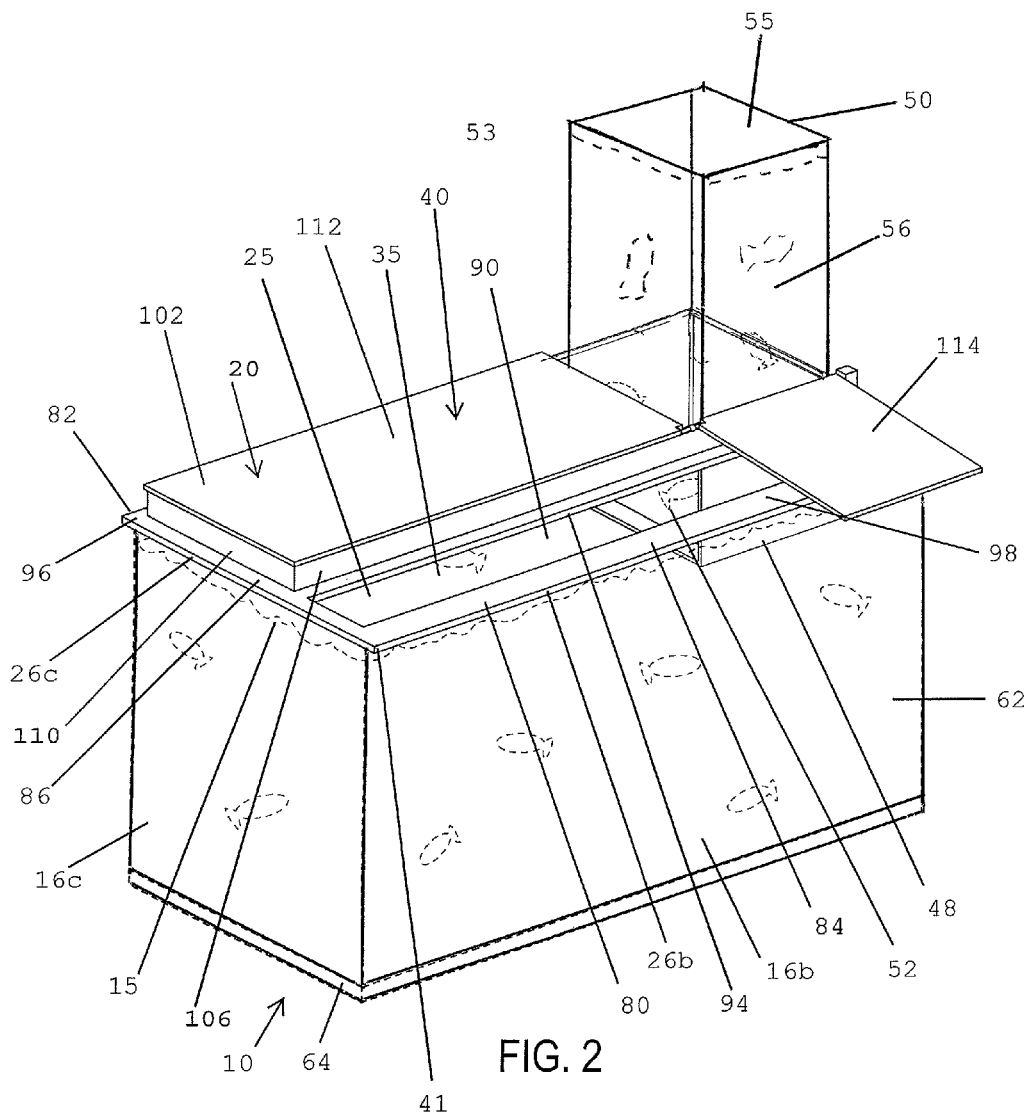
Figure 3:
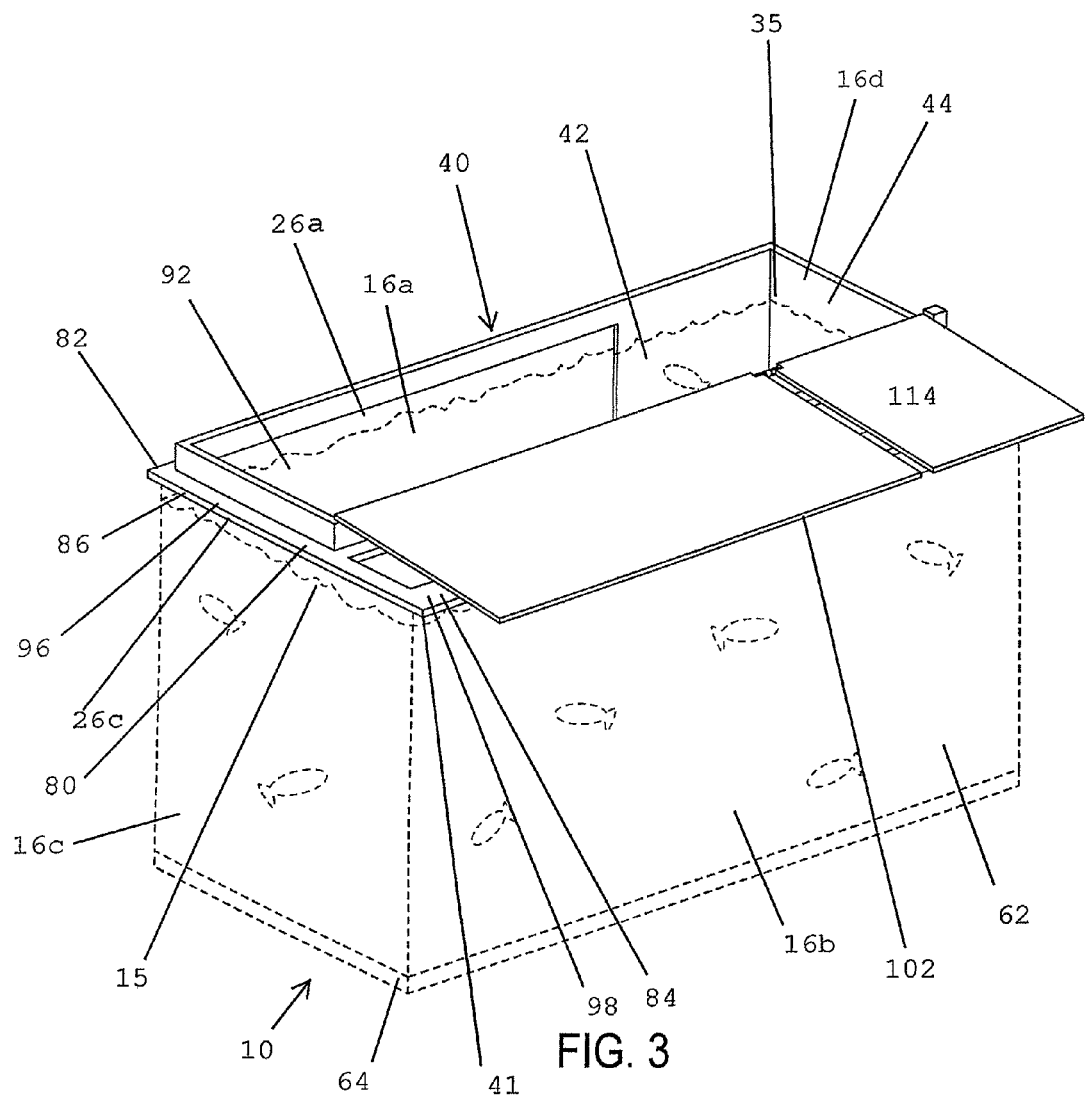
Figure 4:
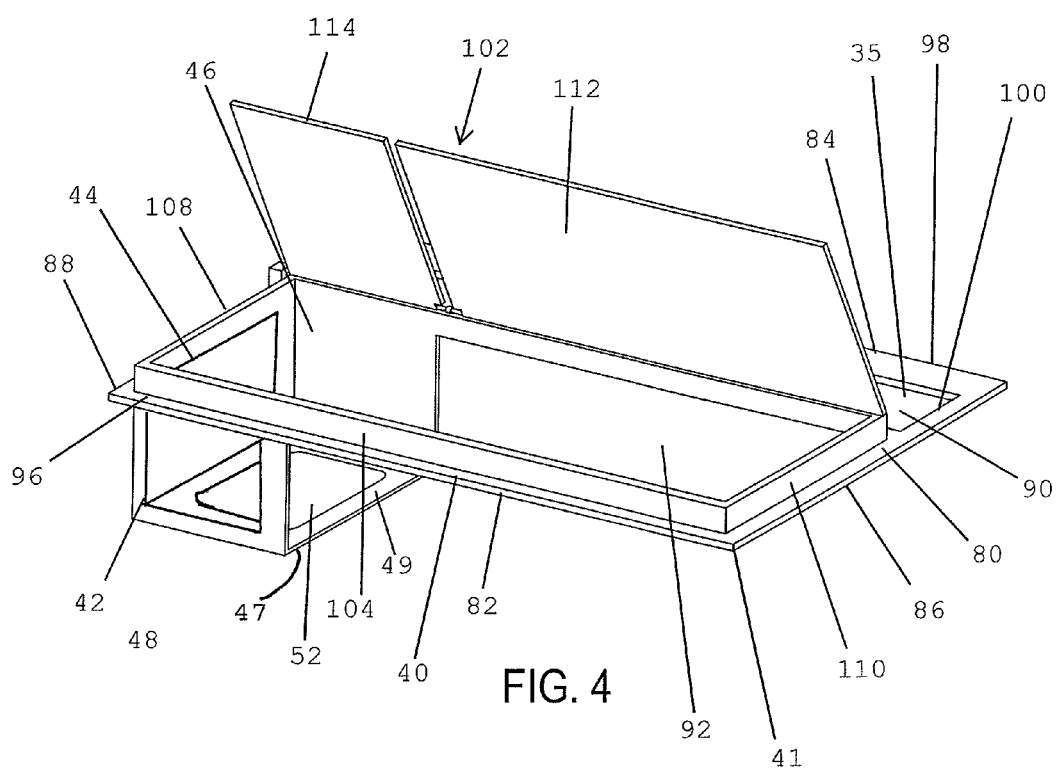
FIGS. 4 and 5 are detailed views of the aquarium hood employed in accordance with the present invention.
Figure 5:
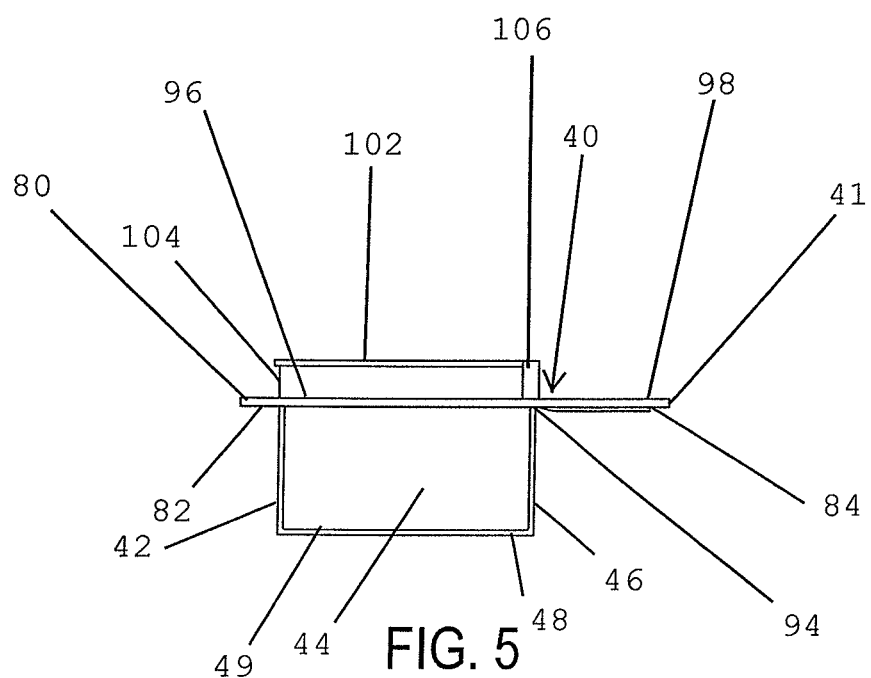

While the aquarium shown with reference to FIGS. 1 to 3 is an all glass construction, those skilled in the art will certainly appreciate the aquarium frame could be made of different material construction.

Referring to FIGS. 1 to 5, the aquarium accessory including an integral formed support shelf 48 and aquarium hood 40 will be described. The aquarium hood 40 includes a support frame 41 having a hood base member 80 shaped and dimensioned for resting on the upper edge 24 of the aquarium 10. As briefly discussed above, the hood base member 80 is designed to substantially conform to the profile defined by the upper edge 24 of the sidewalls. As a result, and in accordance with a preferred embodiment of the present invention, hood base member 80 includes a front edge 82 which sits upon the upper edge 26a of the front sidewall 16a, a back edge 84 which sits upon the upper edge 26b of the rear sidewall 16b, and first and second lateral edges 86, 88 that sit upon the upper edges 26c, 26d of the first and second lateral sidewalls 16c, 16d, respectively.

The hood base member 80 defines adjacent access openings, in particular, a rear opening 90 and a front opening 92, designed for different purposes in accordance with the present invention. In particular, a transverse dividing member 94 extends between the first and second lateral edges 86, 88 of the hood base member 80 to divide the aquarium hood 40 into a front portion 96 and a rear portion 98. The rear portion 98 is shaped and dimensioned for positioning a lighting member thereon. The front portion 96 of the aquarium hood 40 is provided with a cover 102 pivotally secured thereto for providing access to the aquarium water for fish feeding or the like. In accordance with the present invention the cover 102 provides access for inserting a container to be filled.

Referring also to FIGS. 1 and 2, the rear portion 98 is generally planar and generally rectangular in form with a longitudinally extending generally centrally located window of glass or the like (not shown) positioned over the rear opening 90 defined by the rear portion 98. Filtration and other water maintenance equipment may also be positioned within the rear opening 90 defined by the rear portion 98.

The front portion 96 includes upwardly extending walls 104, 106, 108, 110 defining the periphery thereof. The front opening 92 is shaped and dimensioned such that a user may dip the transparent container 50 therein to fill the container with aquarium water and invert the container 50 for mounting as discussed below in greater detail. As such, the width of the front opening 92, that is, the short dimension of the front opening 92, is larger than the width of the transparent container 50.

In accordance with a preferred embodiment, and in consideration of the rectangular shape being disclosed herein in accordance with a preferred embodiment of the present invention, the front portion 96 includes a front upwardly extending wall 104 secured to the front edge 82 of the hood base member 80, a rear upwardly extending wall 106 secured to the transverse dividing member 94 and first and second lateral upwardly extending walls 108, 110 secured to the first and second lateral edges 86, 88 of the hood base member 80 so as to extend between the front edge 82 and the transverse dividing member 94. The cover 102 is hinged to the rear upwardly extending wall 106 positioned along the transverse dividing member 94 and is shaped and dimensioned to cover the front opening 92 defined along the front portion 96 of the aquarium hood 40. However, and as will be appreciated based upon the following disclosure, the cover 102 is split into a first cover member 112 covering that portion of the front opening 92 along the left or first side of the aquarium hood 40 and a second cover member 114 covering that portion of the aquarium hood 40 along the right or second side of the aquarium hood 40.

As discussed above, the aquarium hood 40 is further provided with a support shelf 48 secured to the hood support frame 41. The support shelf 48 includes an opening or aperture 52 formed therein extending through an upper and lower surface. The support shelf 48 is suspended from a plurality of downwardly extending shelf support arms 42, 44, 46. The downwardly extending support arms may be in the form of a solid wall, such as support arm 46 or in the form of walls with an opening, such as support arms 42 and 44, best shown with reference to FIG. 4. However, the shelf support arms can only be located on three sides of the support shelf 48 as the side 47 closest to the center of front opening 92 needs to remain unobstructed.

The support shelf 48 has an upper surface 49 for supporting a transparent container 50 thereon. The transparent container 50 includes an open end 53, an opposed closed end 55 and transparent sidewalls 56 therebetween. The container 50 is shaped and dimensioned to sit upon the upper surface 49 of support shelf 48 in an inverted configuration, that is, with the open end 53 below the waterline 15 for the creation of a mechanism for holding a column of water above the surface of the water in the aquarium 10, that is, the waterline 15, and thereby providing an additional swimming and viewing area above the upper edge 24 of the aquarium 10. The open end 53 of the container 50 sits upon the upper surface 49 of the support shelf 48 in communication with opening 52 thus permitting fish to swim into the container 50. Although the container disclosed in accordance with the present embodiment is rectangular in cross section, it is contemplated various cross sectional shapes may be employed, for example, circular.

The support shelf 48 is positioned within the front opening 92 defined at the front portion 96 of the aquarium hood 40. In accordance with a preferred embodiment, the support shelf 48 is positioned along the far left side of the front portion 96 and is oriented for selective covering by the second cover member 114 when the shelf is not in use. The positioning of the support shelf 48 to either the far left or far right side of the front opening allows for larger containers 50 to be used since the distance between side 47 of the support shelf 48 and the upwardly extending wall 110 will be longer than if the support shelf 48 was located centrally within front opening 92. Thus, when the first cover member 112 is open a container 50 of similar length and width to the cover member 112 can be inserted into the tank of the aquarium 10 and be filled with aquarium water before placement onto the upper surface 49 of support shelf 48. However, and as those skilled in the art will certainly appreciate, the first and second cover members 112, 114 and the support shelf 48 may be positioned at various locations without departing from the spirit of the present invention, but would limit the length of the transparent container used in accordance with the present invention.

As briefly discussed above, the support shelf 48 is suspended via a first elongated support arm 42, a second elongated support arm 44 and a third elongated support arm 46. The first elongated support arm 42, second elongated support arm 44 and third elongated support arm 46 extend downwardly from the hood support frame 41 into the tank defined by the aquarium frame 12. This three-sided support configuration provides an open side 47 facing that portion of the front opening 92 positioned under the first cover member 112. As previously discussed, and as will be discussed in greater detail below, this allows a user to fully dip the transparent container 50 in the portion of the front opening 92 positioned under the first cover member 112, invert the transparent container 50 with the water therein and, without obstruction, move the transparent container 50 onto the upper surface 49 of support shelf 48 in its inverted orientation, while never allowing the open end 53 of the transparent container 50 above the waterline 15.

The first elongated support arm 42 is positioned adjacent the front upwardly extending wall 104, the second elongated support arm 44 is positioned perpendicular, and adjacent to, the first elongated support arm 42 and the third elongated support arm 46 is positioned perpendicular, and adjacent to, the second elongated support arm 44. Again, there are only support arms on three sides of the support shelf 48. As discussed above, this is important as the container 50 needs to slide onto the upper surface 49 of the support shelf 48 once filled with water from the tank. If there were support arms on all four sides of support shelf 48, an obstruction to placement of the container 50 on the upper surface 49 of support shelf 48 in the front portion 96 would be created. That is, an obstruction between the area under second cover member 114 and area under the first cover member 112 would be created and would require the open end 53 of the transparent container 50 to be lifted above the waterline 15 in order to be placed on the support shelf 48.

In practice, the aquarium frame 12 is filled with water to the waterline 15 such that the support shelf 48 is covered with water. Thereafter, and with both the first cover member 112 and the second cover member 114 up or open as shown in FIG. 3, the transparent container 50 is inserted into the aquarium 10, preferably in the space covered by the first cover member 112, so as to fill it up with water from the aquarium 10. With the transparent container 50 filled, it is inverted such that the closed top wall 55 is facing upwardly and the open end 53 is facing downwardly and retained within the water below the waterline 15. The container 50 is then moved laterally toward the support shelf 48 with the open end 53 of the container 50 submerged and the transparent container 50 filled with water. Once the open end 53 of the container 50 is positioned adjacent the upper surface 49 of support shelf 48, that is, it is inverted for placement of the open end 53 of the container 50 upon the upper surface 49 of support shelf 48 in communication with opening 52 in support shelf 48, the transparent container 50 is left to rest thereon. The weight of the column of water filling the transparent container 50 is sufficient to maintain the container 50 in a steady position upon the support shelf 48. With the transparent container 50 in position, the first cover member 112 is lowered and the transparent container 50 is securely held in position on all four sides thereof, on one side by upwardly extending wall 104, on another by adjacent upwardly extending wall 108 and yet another by upwardly extending wall 106 and on the remaining side by the first cover member 112. In this configuration atmospheric pressure will retain the water within the water container 50 and provide an additional water volume in which the fish may swim and amusement for those viewing the fish.

With the foregoing in mind, it will be appreciated the size of the transparent container 50 is important to convenient use of the present invention. In particular, the transparent container 50 must fit within the front opening 92 in manner allowing the user to conveniently manipulate the container 50. As such, the width of the container 50 must be slightly smaller than the width of the front opening 92 to permit a user to grip the container 50 and dip it into the water of the aquarium. With regard to the length of the container 50, it should be slightly less than the length from the edge of the support shelf 48 to the lateral edge of the front opening 92, that is, the open space within the front opening that is not obstructed by the support shelf 48. This also allows for space to manipulate the container 50 in the manner discussed above.

Figure 6:
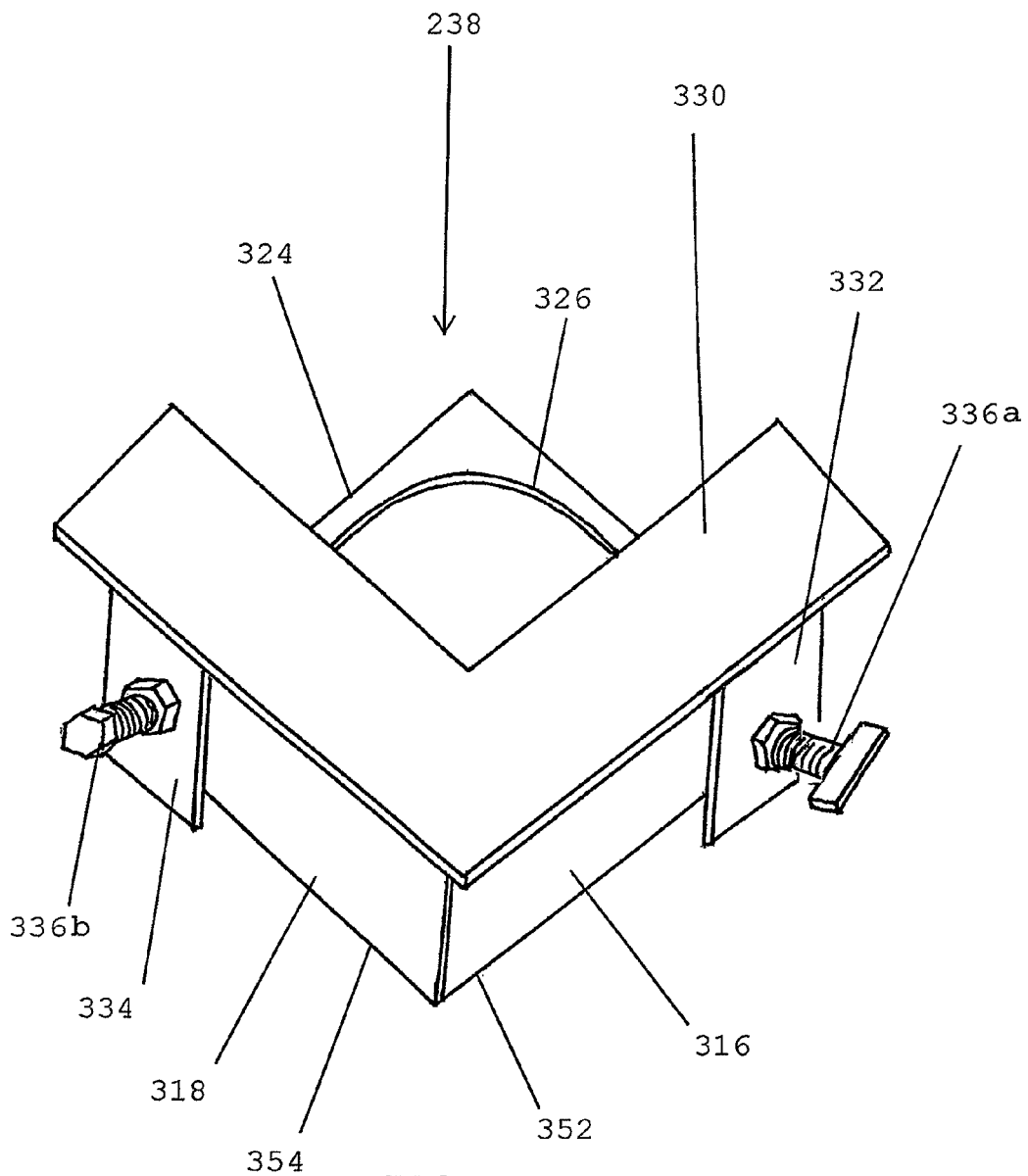
FIGS. 6, 7 and 8 show an alternate embodiment of the present invention.
Figure 7:
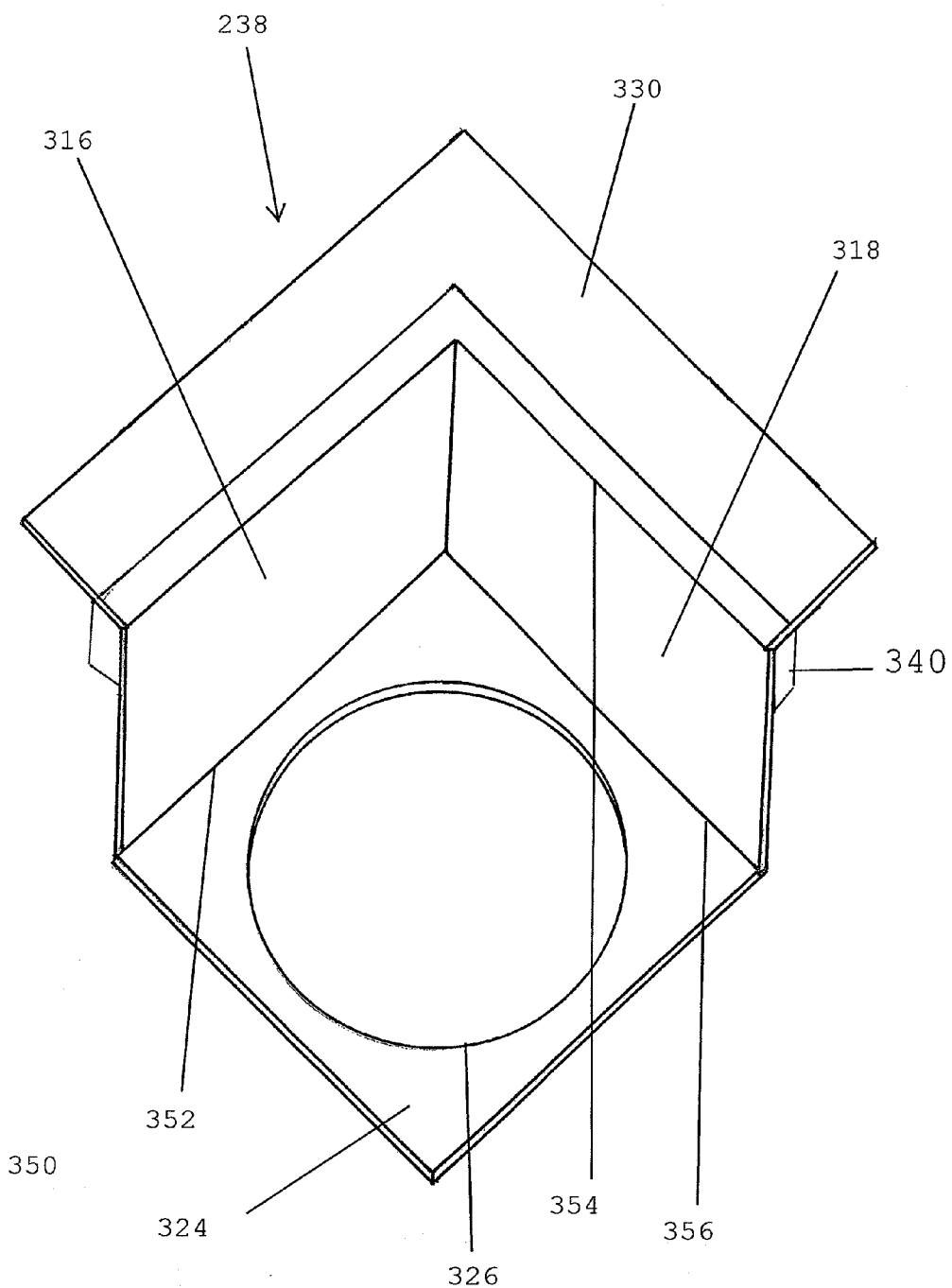
Figure 8:
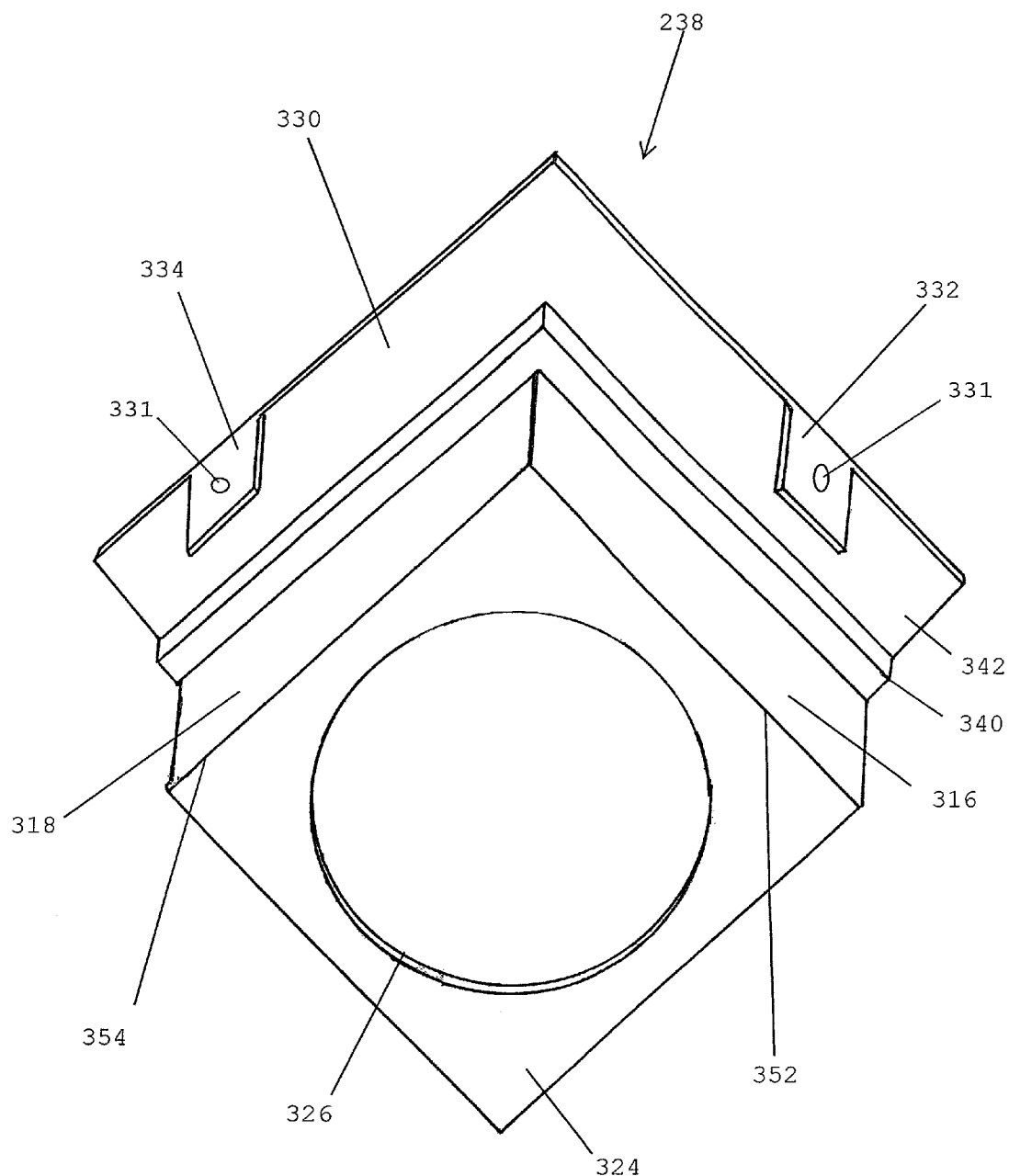

In accordance with the embodiment disclosed above, the support shelf 48 is integrally formed with the aquarium hood 40. However, and in accordance with an alternate embodiment, previously existing hoods may be removed and a temporary support shelf adapter 238, as shown with reference to FIGS. 6 to 8, may be used.

As such, the support shelf adapter 238 includes a downwardly extending first elongated support arm 316 having an upper end 350 and a lower end 352 and a downwardly extending second elongated support arm 318 having an upper end 354 and a lower end 356. Secured at the lower ends 352, 356 of the respective downwardly extending first elongated support arm 316 and downwardly extending second elongated support arm 318 is a shelf member 324 including a central aperture 326.

The downwardly extending first elongated support arm 316 and the downwardly extending second elongated support arm 318 are oriented for positioning adjacent upstanding sidewalls of an aquarium. As such, both the downwardly extending first elongated support arm 316 and the downwardly extending second elongated support arm 318 lie in a vertically oriented plane when in use and the vertical planes in which the respective downwardly extending first elongated support arm 316 and downwardly extending second elongated support arm 318 are perpendicular such that the support shelf adapter 238 may be mounted in the corner of any size aquarium.

Selective coupling of the support shelf adapter 238 to a conventional aquarium is achieved by the provision of a support frame in the form of a lateral flange member 330 secured to the upper ends 350, 354 of the respective downwardly extending first elongated support arm 316 and the downwardly extending second elongated support arm 318. The lateral flange member 330 lies in a horizontal plane when in use and is, therefore, perpendicularly oriented relative to both the downwardly extending first elongated support arm 316 and the downwardly extending second elongated support arm 318. First and second downwardly extending tabs 332, 334 extend downwardly from the lateral flange member 330. The downwardly extending tabs 332, 334 are shaped and dimensioned to wrap about the adjacent walls of the aquarium. That is, the downwardly extending first elongated support arm 316, the lateral flange member 330 and the downwardly extending tab 332 create a U-shaped channel for positioning about the upper edge 24 and wall of the aquarium 10. Similarly, the downwardly extending second elongated support arm 318, the lateral flange member 330 and the downwardly extending tab 334 create a U-shaped channel for positioning about the upper edge 24 and wall of an aquarium.

Secure attachment is further facilitated through the provision of inwardly directed fasteners, shown as set screw 336a or bolt 336b, which are threaded into threaded apertures 331 in the first and second tabs 332, 334 for engaging the aquarium wall positioned adjacent thereto.

Figure 9:
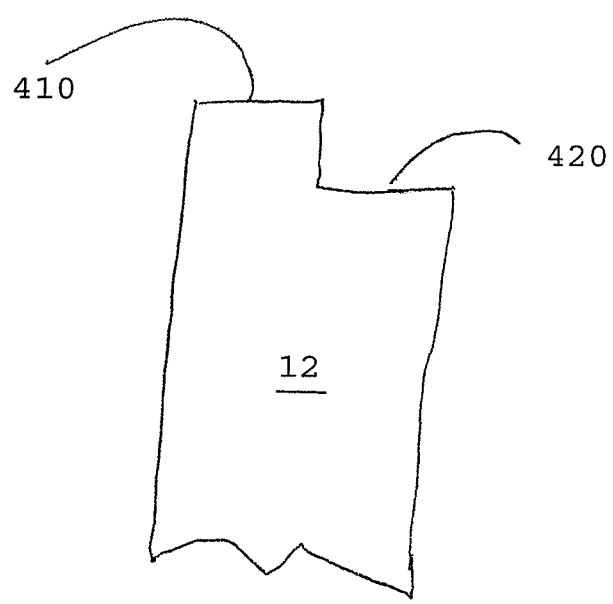
FIG. 9 a cross-section of the upper edge of a conventional aquarium.

The support shelf adapter 238 further includes a ridge member 340 secured to the underside 342 of the lateral flange member 330 adjacent both the first and second elongated support arms 316, 318. The ridge member 340 defines a step allowing for adaptation of the support shelf adapter 238 to various aquarium frame configurations such that lateral flange member 330 remains horizontal and supported by the upper edge of the aquarium. The upper edge of all aquariums are not the same, in that they all include a distinctive stepped profile in cross section as shown in FIG. 9. The stepped profile includes an upper step 410 and lower step 420. The respective lengths of the upper and lower steps 410, 420 tend to vary amongst aquarium sizes and, as such, the ridge member 340 of the present support shelf adapter is designed to be of a width that will cooperate with the length of any lower step 420. The ridge member 340 rests upon the lower step 420 and permits the lateral flange member 330 to rest upon the upper step 410 in a horizontal orientation. The ridge member 340 further functions to reduce the forces applied by the support shelf adapter 238 upon the walls of the aquarium. Thus, the force applied by fasteners 336a, 336b on the glass aquarium walls can be reduced while still being sufficient to support the weight of the transparent container 50 filled with water, as the majority of the weight is being supported by the upper edge of the aquarium.

Figure 10:
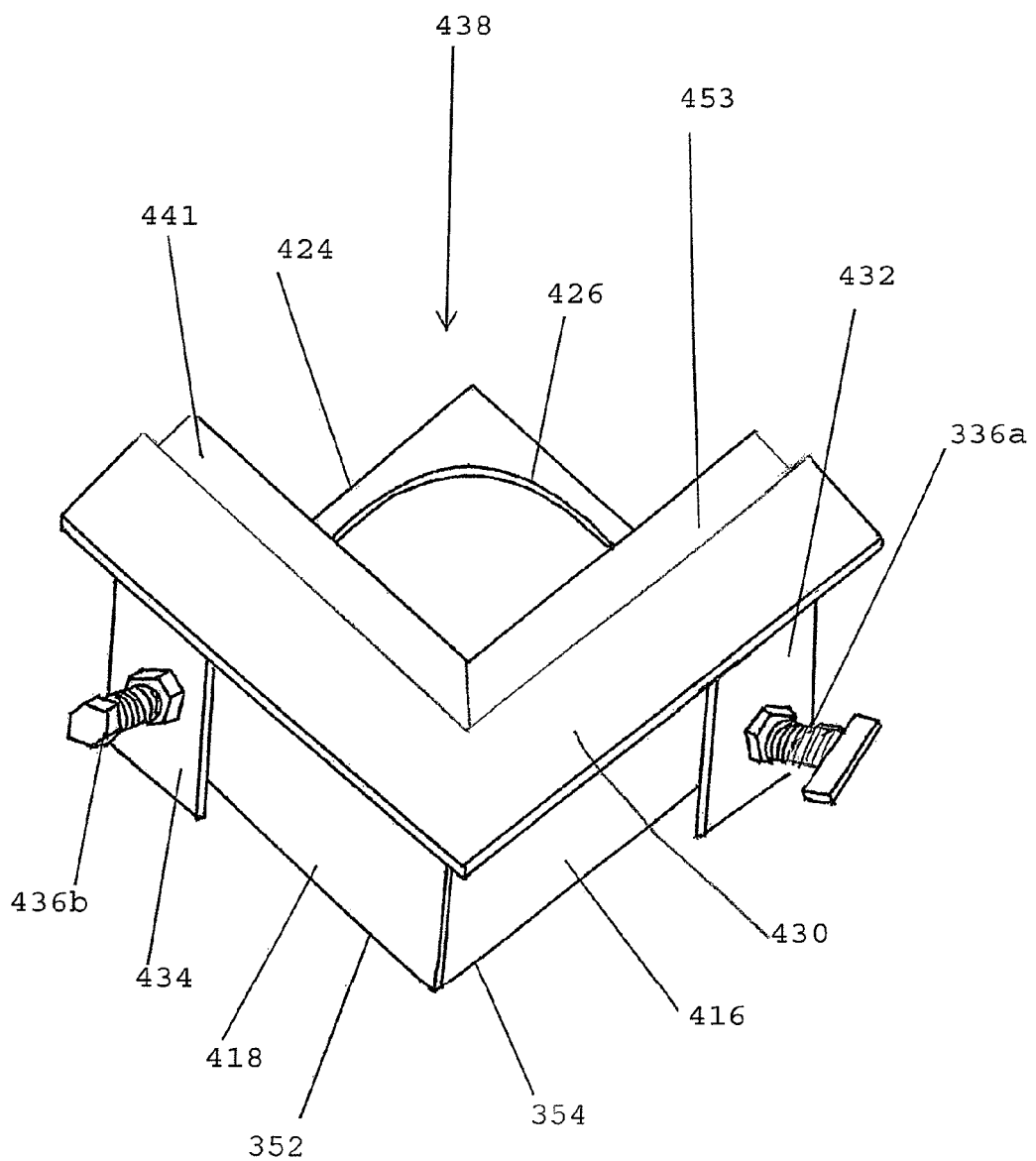
FIGS. 10-12 show another alternate embodiment of the present invention.
Figure 11:
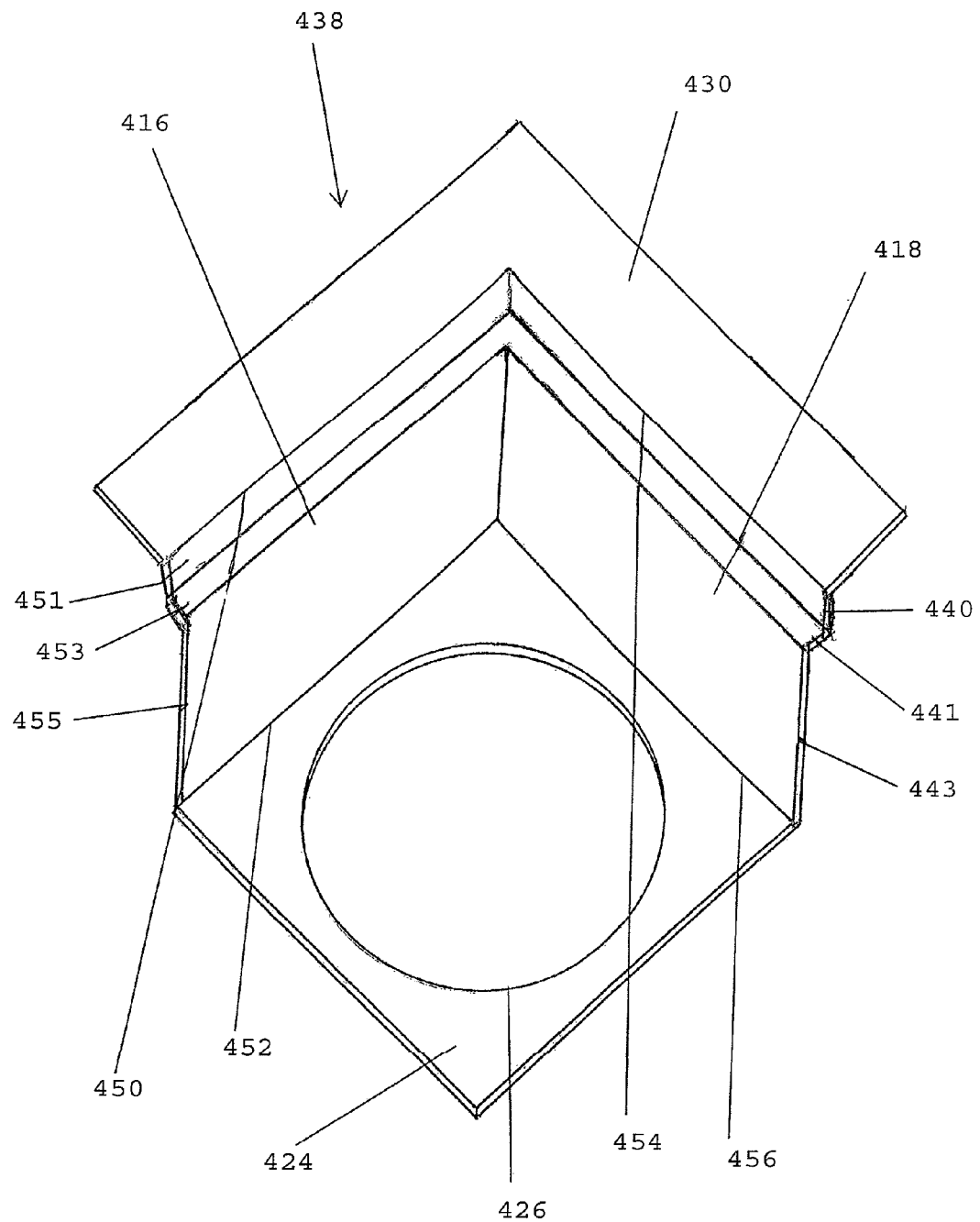
Figure 12:
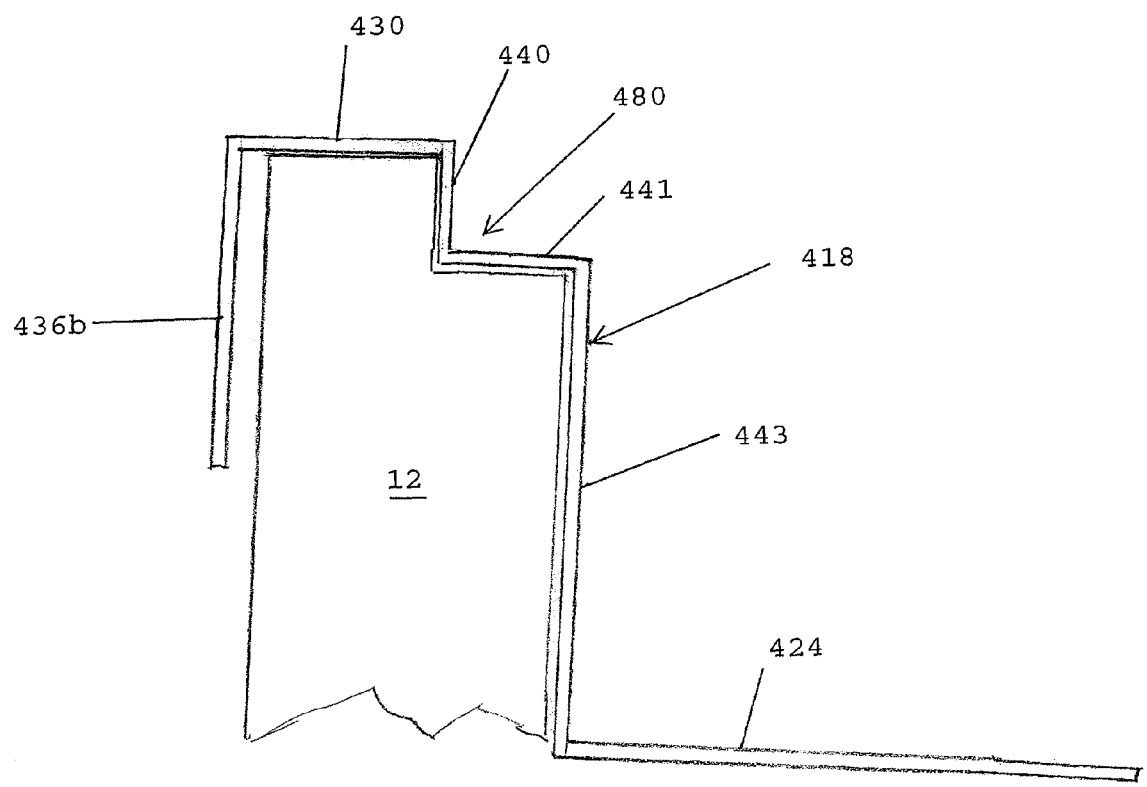

Still further, another embodiment useable with previously existing hoods is contemplated. With reference to FIGS. 10-12, a support shelf adapter 438 similar to the support shelf adapter 238 is disclosed with reference to FIGS. 6 to 8. However, this embodiment is specifically designed to be useable with most conventional hoods that rest upon the lower step 420.

The support shelf adapter 438 includes a downwardly extending first elongated support arm 416 having an upper end 450 and a lower end 452. Starting from the upper end 450, the first elongated support arm 416 includes a short vertical first leg 451 connected to a short horizontal second leg 453 which connects to an elongated vertical third leg 455. The first leg 451 and third leg 455 are substantially parallel to one another and the second leg 453 connecting the first leg 451 and third leg 455 is perpendicular to both the first leg 451 and third leg 455.

The support shelf adapter 438 also includes a downwardly extending second elongated support arm 418 having an upper end 454 and a lower end 456. Starting from the upper end 454, the second elongated support arm 418 includes a short vertical first leg 440 connected to a short horizontal second leg 441 which connects to an elongated vertical third leg 443. The first leg 440 and third leg 443 are parallel to one another and the second leg 441 connecting the first leg 440 and third leg 443 is perpendicular to both the first leg 440 and third leg 443.

Secured at the lower ends 452, 456 of the respective downwardly extending first elongated support arm 416 and downwardly extending second elongated support arm 418 is a shelf member 424 including a central aperture 426.

The downwardly extending first elongated support arm 416 and the downwardly extending second elongated support arm 418 are oriented for positioning adjacent upstanding sidewalls of an aquarium. As such, both the downwardly extending first elongated support arm 416 and the downwardly extending second elongated support arm 418 lie in a vertically oriented plane when in use and the vertical planes in which the respective downwardly extending first elongated support arm 416 and downwardly extending second elongated support arm 418 are perpendicular such that the support shelf adapter 438 may be mounted in the corner of any size aquarium.

Selective coupling of the support shelf adapter 438 to a conventional aquarium and aquarium hood is achieved by the provision of a lateral flange member 430 secured to the upper ends 450, 454 of the respective downwardly extending first elongated support arm 416 and the downwardly extending second elongated support arm 418. The lateral flange member 430 lies in a horizontal plane when in use and is, therefore, perpendicularly oriented relative to both the downwardly extending first elongated support arm 416 and the downwardly extending second elongated support arm 418. Downwardly extending first and second tabs 432, 434 extend downwardly from the lateral flange member 430. The downwardly extending first and second tabs 432, 434 are shaped and dimensioned to wrap about the adjacent walls of the aquarium. That is, the downwardly extending first elongated support arm 416, the lateral flange member 430 and the downwardly extending first tab 432 create a U-shaped channel for positioning about the upper edge and wall of an aquarium. Similarly, the downwardly extending second elongated support arm 418, the lateral flange member 430 and the downwardly extending second tab 434 create a U-shaped channel for positioning about the upper edge and wall of an aquarium.

Secure attached is further facilitated through the provision of inwardly directed fasteners, shown as set screw 436a or bolt 436b, threaded into threaded apertures in the first and second downwardly extending flange members 432, 434 for engaging the aquarium wall positioned adjacent thereto.

As discussed above the first elongated support arm 416 and second elongated support arm 418 of the support shelf adapter 438 include a first leg 451, 440, a second leg 453, 441 and a third leg 455, 443 which define an upwardly facing, L-shaped support surface 480 adjacent the lateral flange member 430. The L-shaped support surface 480 provides a channel into which a perimeter edge of a conventional hood may be inserted while resting the hood over the top of the aquarium. As those skilled in the art will appreciate, the thickness of the second legs 453, 441 will cause a slight rise in the hood when it is placed thereon. If such a rise is undesirable in only one corner of the aquarium, it is contemplated spacers equal in thickness to the second legs 453, 441 may be positioned along lower step 420 in other corners of the aquarium. The L-shaped support surface 480 also includes an underside. The underside defines a step allowing for mating with a profile of the upper edge of the aquarium.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. An aquarium accessory for elevating the water level of an aquarium above the upper edge of the aquarium for viewing fish contained within the aquarium outside of the aquarium, comprising:
    a support shelf to be positioned below the waterline of the aquarium, the support shelf including an upper surface and a lower surface with an aperture extending through the upper surface and the lower surface to form an opening for fish to swim through;
    a support frame shaped and dimensioned for mounting along an upper edge of the aquarium, the support frame includes a lateral flange member to which is connected at least one elongated support arm wherein the at least one elongated support arm is connected to the lateral flange member so that the lateral flange member and the support shelf are parallel and spaced from one another, a step is positioned between the lateral flange member and the at least one elongated support arm in order to mate with a profile of the upper edge of the aquarium; and
    a transparent container shaped and dimensioned to sit upon the upper surface of the support shelf in an inverted configuration for creation of a mechanism for holding water above the aquarium and thereby providing additional swimming area for fish in the aquarium; and
    wherein the at least one elongated support arm includes a first elongated support arm and a second elongated support arm perpendicular thereto and the support frame further includes a first tab downwardly extending from the lateral flange member, the first tab being spaced and parallel to the first elongated support arm, and a second tab downwardly extending from the lateral flange member, the second tab being spaced and parallel to the second elongated support arm, wherein the first and second elongated support arms the lateral flange member and first and second tabs are shaped and dimensioned to wrap about adjacent walls of the aquarium when attached thereto.

2. The aquarium accessory according to claim 1, wherein the first tab includes a threaded aperture and a fastener threaded into the threaded aperture in the direction of the first elongated support arm and the second tab includes a threaded aperture and a fastener threaded into the threaded aperture in the direction of the second elongated support arm.

3. The aquarium accessory according to claim 1, wherein the step is a ridge member secured to an underside of the lateral flange member.

4. The aquarium accessory according to claim 1, wherein the step is an L-shaped support surface formed between the at least one elongated support arm and the lateral flange member.

5. The aquarium accessory according to claim 4, further including an aquarium hood secured within the L-shaped support surface.

6. The aquarium accessory according to claim 1, wherein the support frame includes plural covers pivotally attached thereto.

7. The aquarium accessory according to claim 6, wherein the support frame includes a hood base member shaped and dimensioned to substantially conform to a profile defined by the upper edge of the aquarium.

8. The aquarium accessory according to claim 7, wherein the hood base member includes a front edge, a back edge, a first lateral edge and a second lateral edge; the hood base member further including a transverse dividing member extending between the first lateral edge and the second lateral edge to divide the hood base member into a front portion having a front opening and a rear portion having a rear opening.

9. The aquarium accessory according to claim 8, wherein the front portion of the hood base member includes upwardly extending walls defining a periphery thereof, and a cover is pivotally secured thereto for selective access to the front opening.

* * * * *